(12) United States Patent
Takeuchi

(10) Patent No.: US 10,611,074 B2
(45) Date of Patent: Apr. 7, 2020

(54) STRAND MANUFACTURING DEVICE, PELLET MANUFACTURING DEVICE, STRAND MANUFACTURING METHOD, AND PELLET MANUFACTURING METHOD

(71) Applicant: THE JAPAN STEEL WORKS, LTD., Tokyo (JP)

(72) Inventor: Takahide Takeuchi, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 484 days.

(21) Appl. No.: 15/320,965

(22) PCT Filed: Jun. 26, 2015

(86) PCT No.: PCT/JP2015/068592
§ 371 (c)(1),
(2) Date: Dec. 21, 2016

(87) PCT Pub. No.: WO2015/199238
PCT Pub. Date: Dec. 30, 2015

(65) Prior Publication Data
US 2017/0173838 A1    Jun. 22, 2017

(30) Foreign Application Priority Data

Jun. 26, 2014    (JP) .................. 2014-131063

(51) Int. Cl.
*B29C 48/25*        (2019.01)
*B29C 48/05*        (2019.01)
*B29C 48/00*        (2019.01)
*B29C 48/30*        (2019.01)
*B29C 48/345*       (2019.01)
(Continued)

(52) U.S. Cl.
CPC .............. *B29C 48/251* (2019.02); *B29B 9/06* (2013.01); *B29C 48/0022* (2019.02); *B29C 48/05* (2019.02); *B29C 48/30* (2019.02); *B29C 48/345* (2019.02); *B29C 48/04* (2019.02); *B29C 48/2515* (2019.02); *B29C 48/919* (2019.02);
(Continued)

(58) Field of Classification Search
CPC ........................... B29C 48/251; B29C 48/345
USPC ....................................................... 264/143
See application file for complete search history.

(56) References Cited

U.S. PATENT DOCUMENTS 5,608,637 A * 3/1997 Wang ..................... B29C 48/30
                                                     700/97
5,919,509 A * 7/1999 Cremers .............. A21C 11/163
                                                    264/176.1
8,337,191 B2 * 12/2012 Keller .................... B29C 48/30
                                                    425/461

FOREIGN PATENT DOCUMENTS

EP    2 251 177 A2    11/2010
JP      489224 A       3/1992
(Continued)

OTHER PUBLICATIONS

KR20110099957 Machine Translation (Year: 2011).*
(Continued)

*Primary Examiner* — Peter L Vajda
*Assistant Examiner* — Russell E Sparks
(74) *Attorney, Agent, or Firm* — Sughrue Mion, PLLC

(57) ABSTRACT

A dimension in a Y-direction of a slit section (26) decreases gradually as a distance from an inflow port (23) in an X-direction increases. A cross-section of a manifold section (25) that is orthogonal to the X-direction decreases gradually as a distance from the inflow port (23) in the X-direction increases.

5 Claims, 7 Drawing Sheets

(51) Int. Cl.
    *B29B 9/06*     (2006.01)
    *B29C 48/88*     (2019.01)
    *B29C 48/04*     (2019.01)
    *B29K 101/12*     (2006.01)
    *B29L 31/00*     (2006.01)

(52) U.S. Cl.
    CPC .. *B29C 2793/0027* (2013.01); *B29K 2101/12* (2013.01); *B29L 2031/772* (2013.01)

(56) References Cited

FOREIGN PATENT DOCUMENTS

| | | | | |
|---|---|---|---|---|
| JP | 5278027 A | 10/1993 | | |
| JP | 2006-1015 A | 1/2006 | | |
| JP | 2007320056 A | 12/2007 | | |
| JP | 2010264629 A | 11/2010 | | |
| JP | 2013-233702 A | 11/2013 | | |
| KR | 20110099957 A | * | 9/2011 | ........... B29C 48/397 |
| WO | WO-2015022408 A1 | * | 2/2015 | ......... B29C 47/0011 |

OTHER PUBLICATIONS

International Search Report dated Sep. 29, 2015, by the International Searching Authority in counterpart International Application No. PCT/JP2015/068592 (PCT/ISA/210).
Written Opinion dated Sep. 29, 2015, issued by the International Searching Authority in counterpart International Application No. PCT/JP2015/068592 (PCT/ISA/237).
Communication issued by the European Patent Office dated Feb. 21, 2018 in counterpart European Patent Application No. 15811683.0.
Communication issued by the Japanese Patent Office in counterpart Japanese application 2014-131063 dated Sep. 5, 2017.

* cited by examiner

STRAND MANUFACTURING DEVICE, PELLET MANUFACTURING DEVICE, STRAND MANUFACTURING METHOD, AND PELLET MANUFACTURING METHOD

TECHNICAL FIELD

The present invention relates to a device for manufacturing strands and pellets that are made of thermoplastic resin raw material (hereinafter, simply referred to as "resin raw material") and a method for manufacturing strands and pellets that are made of the resin raw material.

BACKGROUND ART

When manufacturing a thermoplastic resin molded product, a pellet that is made of resin raw material (hereinafter, simply referred to as "pellet") is used in some cases. As one method of molding the pellet, a strand-cut method has been known (PTL 1).

FIG. 10 is a diagram for explaining a strand-cut method disclosed in PTL 1. As illustrated in FIG. 10, in the strand-cut method, the resin raw material is melted, and the melted resin raw material is extruded from a die 2 by an extruder 1. A through hole is formed in the die 2. The resin raw material is extruded from the through hole and formed in a string shape, and thus a strand 3 is manufactured. Then, a pellet 5 is completed by cutting the strand 3 in a predetermined length using a cutting device 4.

In recent years, a technique for manufacturing the strand by using a die that includes a plurality of through holes has been proposed (PTL 2). The plurality of through holes are arranged in a direction orthogonal to the direction in which the resin raw material is extruded (hereinafter, the direction is referred to as a "width direction"). The die is attached to the extruder via a flow passage member (also called as a "die supporting device").

FIG. 11 is a schematic diagram of the flow passage member and the die disclosed in PTL 2. As illustrated in FIG. 11, the flow passage member 6 defines a flow passage 9 that allows the through holes 8 of the die 7 to communicate with an outlet (not illustrated) of the extruder. The width of an inflow port 10 of the flow passage 9 (referred to as a dimension of the width direction) is smaller than the width of an outflow port 11 of the flow passage 9, and the flow passage 9 gradually spreads in the width direction toward the outflow port 11 from the inflow port 10.

Since the flow passage 9 has such a shape, a first path R1 that reaches to the through holes 8 without proceeding in the width direction from the inflow port 10 and a second path R2 of the resin raw material that reaches to the through holes 8 while proceeding in the width direction from the inflow port 10 are formed in the flow passage 9. Therefore, the resin raw material that flows into the flow passage 9 from the extruder is guided into the plurality of through holes 8, and thus it is possible to manufacture collectively a plurality of strands. As a result, it is possible to manufacture more pellets in a shorter time.

CITATION LIST

Patent Literature

PTL 1: JP-A-5-278027
PTL 2: JP-A-2010-264629

SUMMARY OF INVENTION

Technical Problem

When the outer diameter of the strand varies, the weight per one pellet obtained by cutting each strand in a predetermined length varies. In a case where the pellet having a large variation in the weight is used for manufacturing the thermoplastic resin molded product, a measurement failure of the resin raw material occurs, and thus it is likely to cause a molding failure. For this reason, it is desirable that the outer diameter of the strand is uniform.

It is known that the outer diameter of the strand depends on a flow rate of the resin raw material in the through hole of the die. Therefore, in a case where the strand is manufactured by using a die including a plurality of through holes, a flow rate of the resin raw material in each through hole is required to be uniform.

However, in the strand manufacturing device disclosed in PTL 2 (refer to FIG. 11), the flow passage 9 has a constant thickness regardless of a position in the width direction (referred to as a dimension in a direction orthogonal to the width direction and a direction in which the resin raw material is extruded). Since the second path R2 is longer than the first path R1, a flow resistance of the resin raw material flowing through the second path R2 is larger than a flow resistance of the resin raw material flowing through the first path R1.

The flow resistance of the resin raw material flowing through the second path is larger than the flow resistance of the resin raw material flowing through the first path R1, and thus a flow rate of the resin raw material in the second path R2 becomes less than a flow rate of the resin raw material in the first path R1. As a result, a variation in a flow rate of the resin raw material in each through hole 8 increases, and thus a variation in the outer diameter of each strand may exceed an allowable range in some cases.

The present invention has been made in consideration of the problems, and an object thereof is to reduce a variation in the outer diameter of each strand.

Solution to Problem

The object of the present invention is achieved by the following configurations.

(1) A strand manufacturing device comprising:
a die comprising a plurality of through holes arranged therein; and
a flow passage member that defines a flow passage for supplying resin raw material in a molten state to the plurality of through holes,
wherein the flow passage comprises:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases, and wherein a cross-section of the manifold section that is orthogonal to the first direction decreases gradually as a distance from the inflow port in the first direction increases.

(2) The strand manufacturing device according to the above (1), wherein the manifold section and the slit section have a shape based on an equation obtained by solving an equation indicating a balance state between a force due to a pressure of the resin raw material and a force due to a shear stress of the resin raw material in each of the manifold section and the slit section, using the relationship among a shear stress, a viscosity, and a shear speed, the relationship between a shear speed and the slope of a flow speed, and the relationship between a flow speed and a flow rate, under a condition in which a flow rate in the outflow port is constant with respect to the first direction.

(3) The strand manufacturing device according to the above (1), wherein the slit section comprises an adjacent slit section that is adjacent to the manifold section, wherein the walls of the flow passage of the adjacent slit section that face to a third direction orthogonal to the first direction and the second direction are parallel to each other, wherein a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e a \cdot x \qquad \text{[Mathematical 1]}$$

wherein a cross-section of the manifold section has a circular shape, and the radius R of the cross-section of the manifold section at a position away from the end portion of the adjacent slit section by a distance x toward the inflow port along the first direction has a value that is obtained based on the following equation:

[Mathematical 2]

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to a distance x, N is the inverse of a power law index of the resin raw material, and $h_1$ is a dimension in the third direction of the adjacent slit section.

(4) A pellet manufacturing device comprising:
the strand manufacturing device according to any one of the above (1) to (3); and
a cutting device that cuts strands which are collectively manufactured by using the strand manufacturing device.

(5) A strand manufacturing method comprising:
a step of supplying resin raw material in a molten state from a flow passage member to a die, the die comprising a plurality of through holes arranged therein; and
a step of molding strands by extruding the resin raw material from the plurality of through holes,
wherein as the flow passage member, a member that defines a flow passage is used as the flow passage member, the flow passage comprising:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases, and
wherein a cross-section of the manifold section that is orthogonal to the first direction decreases gradually as a distance from the inflow port in the first direction increases.

(6) The strand manufacturing method according to the above (5), wherein as the flow passage member, the member that defines the flow passage is used as the flow passage member, the manifold section and the slit section having a shape based on an equation obtained by solving an equation indicating a balance state between a force due to a pressure of the resin raw material and a force due to a shear stress of the resin raw material in each of the manifold section and the slit section, using the relationship among a shear stress, a viscosity, and a shear speed, the relationship between a shear speed and the slope of a flow speed, and the relationship between a flow speed and a flow rate, under a condition in which a flow rate in the outflow port is constant with respect to the first direction.

(7) The strand manufacturing method according to the above (5),
wherein as the flow passage member, the member that defines the flow passage is used as the flow passage member, the slit section comprising an adjacent slit section that is adjacent to the manifold section, in which the walls of the flow passage of the adjacent slit section that face to a third direction orthogonal to the first direction and the second direction are parallel to each other, in which a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e + a \cdot x \quad \text{[Mathematical 3]}$$

in which a cross-section of the manifold section has a circular shape, and the radius R of the cross-section of the manifold section at a position away from the end portion of the adjacent slit section by a distance x toward the inflow port along the first direction has a value that is obtained based on the following equation:

[Mathematical 4]

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to a distance x, N is the inverse of a power law index of the resin raw material, and $h_1$ is a dimension in the third direction of the adjacent slit section.

(8) A pellet manufacturing method comprising:
a step of collectively manufacturing a plurality of strands by using the strand manufacturing method according to any one of the above (5) to (7); and
a step of cutting the plurality of strands.

In order to achieve the object, an aspect of the present invention provides a strand manufacturing device including a die and a flow passage member. In the aspect, the die includes a plurality of through holes which are arranged. The flow passage member defines a flow passage supplying resin raw material in a molten state to the plurality of through holes. The flow passage includes an outflow port that extends in a first direction in which the plurality of through holes are arranged and reaches to the plurality of through holes, an inflow port in which a dimension in the first direction is smaller than a dimension of the outflow port, a manifold section that extends from the inflow port in the first direction and a second direction orthogonal to the first direction, and a slit section that is connected to the manifold section in the second direction and extends from the manifold section to the outflow port. A dimension in the second direction of the slit section decreases gradually as a distance from the inflow port in the first direction increases. A cross-section of the manifold section that is orthogonal to the first direction decreases gradually as a distance from the inflow port in the first direction increases.

Another aspect of the present invention provides a strand manufacturing method including: supplying resin raw material from a flow passage member to a die that includes a plurality of through holes which are arranged; and molding strands by extruding the resin raw material from the plurality of through holes. In the aspect, a member that defines a flow passage is used as the flow passage member, the flow passage including an outflow port that extends in a first direction in which the plurality of through holes are arranged and reaches to the plurality of through holes, an inflow port in which a dimension in the first direction is smaller than a dimension of the outflow port, a manifold section that extends from the inflow port in the first direction and a second direction orthogonal to the first direction, and a slit section that is connected to the manifold section in the second direction and extends from the manifold section to the outflow port, in which a dimension in the second direction of the slit section decreases gradually as a distance from the inflow port in the first direction increases, and in which a cross-section of the manifold section that is orthogonal to the first direction decreases gradually as a distance from the inflow port in the first direction increases.

Advantageous Effects of Invention

According to the present invention, it is possible to reduce a variation in the outer diameter of each strand.

DESCRIPTION OF EMBODIMENTS

Figure 1:
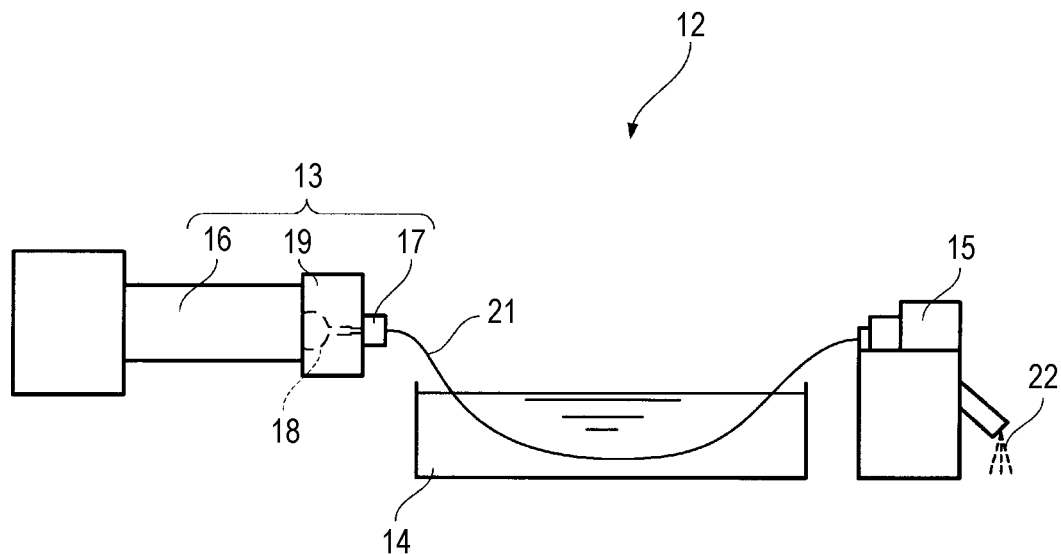
FIG. 1 is a schematic side view of a pellet manufacturing device according to an embodiment of the present invention.

Hereinafter, embodiments according to the present invention will be described with reference to the drawings. FIG. 1 is a schematic side view of a pellet manufacturing device including a strand manufacturing device according to the present embodiment.

As illustrated in FIG. 1, a pellet manufacturing device 12 includes a strand manufacturing device 13, a cooling tank 14, and cutting means 15. The strand manufacturing device 13 includes an extruder 16 that melts resin raw material and extrudes the melted resin raw material, a die 17 that molds the melted resin raw material in a string shape, and a flow passage member 19 that defines a flow passage 18 extending from the extruder 16 to the die 17.

Figure 2:
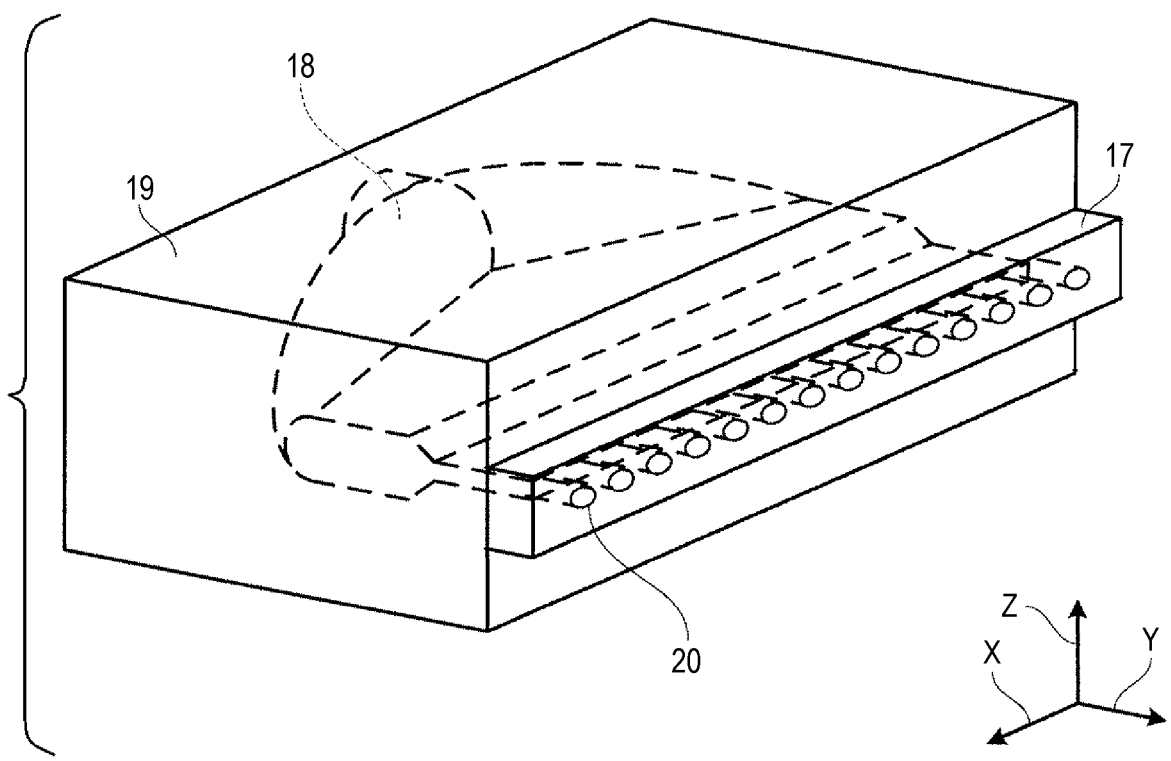
FIG. 2 is a perspective view of a die and a flow passage member illustrated in FIG. 1.

FIG. 2 is a perspective view of the die 17 and the flow passage member 19. As illustrated in FIG. 2, a plurality of through holes 20 that are arranged in a first direction (hereinafter, also referred to as an "X-direction") are formed in the die 17. The resin raw material in a molten state is extruded from the extruder 16 (refer to FIG. 1), and supplied to the through holes 20 via the flow passage 18 in the flow passage member 19. The resin raw material is extruded from the through holes 20 and formed in a string shape, and thus a strand 21 (refer to FIG. 1) is manufactured.

Referring again to FIG. 1, the strand 21 molded by using the die 17 is cooled and solidified in the cooling tank 14. The cutting means 15 cuts the solidified strand 21 in a predetermined length, and thus a pellet 22 is manufactured.

Figure 3:
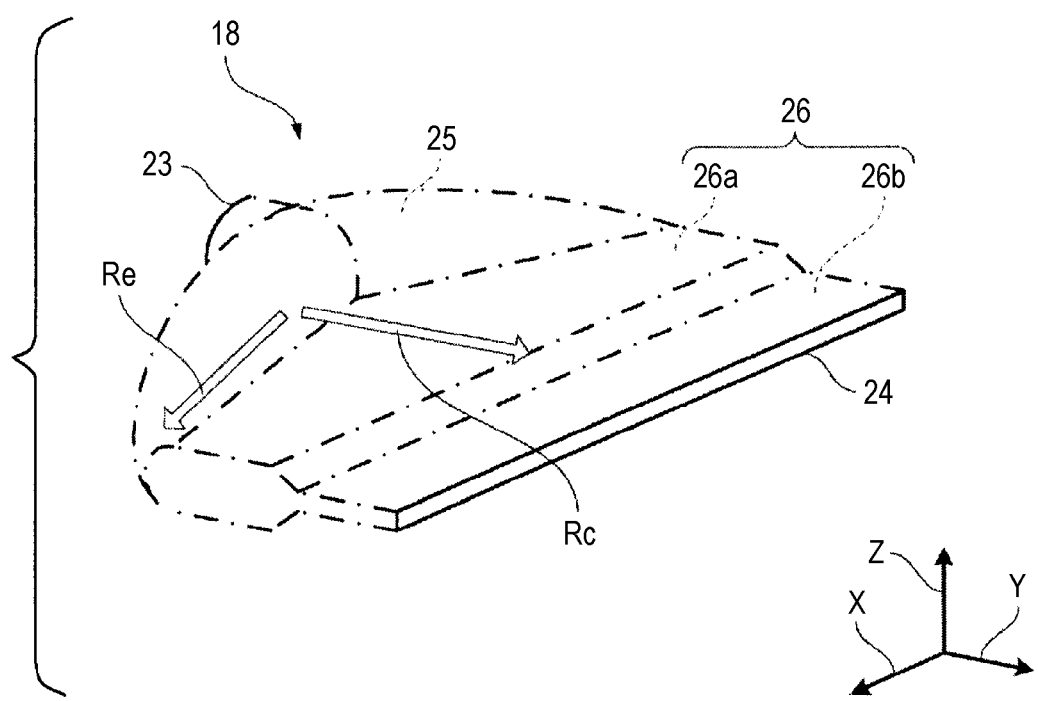
FIG. 3 is a schematic perspective view of a flow passage illustrated in FIG. 2.

FIG. 3 is a schematic perspective view of the flow passage 18 illustrated in FIG. 2. As illustrated in FIG. 3, the flow passage 18 includes an inflow port 23, an outflow port 24, a manifold section 25, and a slit section 26.

The outflow port 24 has a rectangular shape extending in the X-direction. The inflow port 23 is positioned at the substantial center portion in the X-direction of the flow passage member 19 (refer to FIG. 2). A dimension in the X-direction of the inflow port 23 is smaller than a dimension in the X-direction of the outflow port 24.

The manifold section 25 extends in the X-direction and a second direction orthogonal to the X-direction (hereinafter, also referred to as a "Y-direction"). A dimension in the X-direction of the manifold section 25 is substantially equal to a dimension in the X-direction of the outflow port 24. The slit section 26 is connected to the manifold section 25 in the Y-direction. The slit section 26 extends from the manifold section 25 to the outflow port 24.

In this description, a third direction orthogonal to the X-direction and the Y-direction also referred to as a Z-direction. A dimension in the Z-direction of the slit section 26 is smaller than a dimension in the Z-direction of the manifold section 25. Thus, the flow resistance in the slit section 26 is larger than the flow resistance in the manifold section 25. Therefore, the resin raw material flows from the inflow port 23 to the manifold section 25, and then spreads in X-direction in the manifold section 25 and flows into the slit section 26. Of course, a part of the resin raw material traverses the manifold section 25 in the Y-direction, and reaches to the slit section 26 from the inflow port 23.

The slit section 26 includes a first slit section 26a that is adjacent to the manifold section 25 (also referred to as an "adjacent slit section"), and a second slit section 26b that is positioned between the first slit section 26a and the outflow port 24. A dimension in the Z-direction of the second slit section 26b is smaller than a dimension in the Z-direction of the first slit section 26a. A cross-section of the second slit section 26b in a direction orthogonal to the Y-direction has the same shape and size as that of the outflow port 24.

The resin raw material that flows into the slit section 26 flows through the slit section 26 in the Y-direction, and is guided into the outflow port 24.

Here, the shapes of the manifold section 25 and the slit section 26 will be described in more detail.

A dimension in the Y-direction of the slit section 26 decreases gradually as a distance from the inflow port 23 in the X-direction increases. A position of the manifold section 25 approaches gradually to the outflow port 24 as a distance from the inflow port 23 in the X-direction increases. In other words, the boundary between the manifold section 25 and the slit section 26 is inclined with respect to the X-direction.

The boundary between the manifold section 25 and the slit section 26 is inclined with respect to the X-direction, and thus the difference in the flow resistance between paths can be reduced. As a result, it is possible to suppress a variation in a flow rate in the outflow port 24.

The reason why the difference in the flow resistance between the paths is reduced will be described by a comparison of a center path Rc (refer to FIG. 3) and an end path Re (refer to FIG. 3). The "center path Rc" is a path in which the resin raw material starts to flow from the inflow port 23, traverses the manifold section 25 in the Y-direction, flows into the slit section 26, then flows through the slit section 26 in the Y-direction, and reaches to the outflow port 24. The "end path Re" is a path in which the resin raw material starts to flow from the inflow port 23, flows through the manifold section 25 in the X-direction, flows into the slit section 26 in the vicinity of the end portion in the X-direction of the manifold section 25, then flows through the slit section 26 in the Y-direction, and reaches to the outflow port 24.

It is known that the flow resistance depends on the length of the path in which the resin raw material flows and the space between the walls of the flow passage of the path.

The total length of the center path Rc is shorter than the total length of the end path Re by the length as the resin raw material does not flow in the X-direction in the manifold section 25. Accordingly, the flow resistance of the center path Rc is less sensitive to the length of the path compared to the end path Re.

Further, a dimension in the Z-direction of the slit section 26 is shorter than a dimension in the Z-direction of the manifold section 25. Thus, as the path in the slit section 26 is longer, the flow resistance is more sensitive to the space between the walls of the flow passage. A dimension in the Y-direction of the slit section 26 decreases gradually as a distance from the inflow port 23 in the X-direction increases, and thus the length of the slit section 26 in the center path Rc is longer than the length of the slit section 26 in the end path Re. Accordingly, the flow resistance of the center path Rc is more sensitive to the space between the walls of the flow passage compared to the end path Re.

As described above, the flow resistance of the center path Rc is less sensitive to the length of the path, and more sensitive to the space between the walls of the flow passage, compared to the end path Re. Accordingly, the difference between the flow resistance of the center path Rc and the flow resistance of the end path Re decreases.

The difference between the flow resistance of the center path Rc and the flow resistance of the end path Re is reduced, and thus it is possible to suppress the difference between a flow rate at a portion of the outflow port 24 that is positioned on the center path Rc and a flow rate at a portion of the outflow port 24 that is positioned on the end path Re.

Next, the size of a cross-section of the manifold section 25 that is orthogonal to the X-direction (hereinafter, simply referred to as a "manifold cross-section") will be described. The manifold cross-section decreases gradually as a distance from the inflow port in the X-direction increases.

The resin raw material spreads in the manifold section 25 in the X-direction and flows into the slit section 26. Thus, in the manifold section 25, an amount of the resin raw material decreases gradually, and a pressure of the resin raw material is likely to decrease as the position thereof from the inflow port 23 in the X-direction increases. As a result, a force in the Y-direction is unlikely to be applied to the resin raw material, and the amount of the resin raw material that flows into the slit section 26 is likely to be reduced.

In the present embodiment, the manifold cross-section decreases gradually as a distance from the inflow port in the X-direction increases, and thus a pressure of the resin raw material is maintained even at a position away from the inflow port 23 in the X-direction. Therefore, a force in the Y-direction is likely to be applied to the resin raw material, and the resin raw material is likely to flow into to the slit section 26 from the manifold section 25. Accordingly, a flow rate of the resin raw material that flows into the slit section 26 is unlikely to vary in X-direction, and thus it is possible to further reduce a variation in a flow rate in the outflow port 24.

According to the present embodiment (refer to FIG. 1, FIG. 2, and FIG. 3), it is possible to reduce a variation in a flow rate in the outflow port 24. Thus, a variation in a flow rate in the through hole 20 can be reduced, and it is possible to reduce a variation in the outer diameter of each strand 21. Further, according to the pellet manufacturing device 12 including the strand manufacturing device 13 of the present embodiment, it is possible to reduce a variation in the size and weight of the pellet 22.

Figure 4:
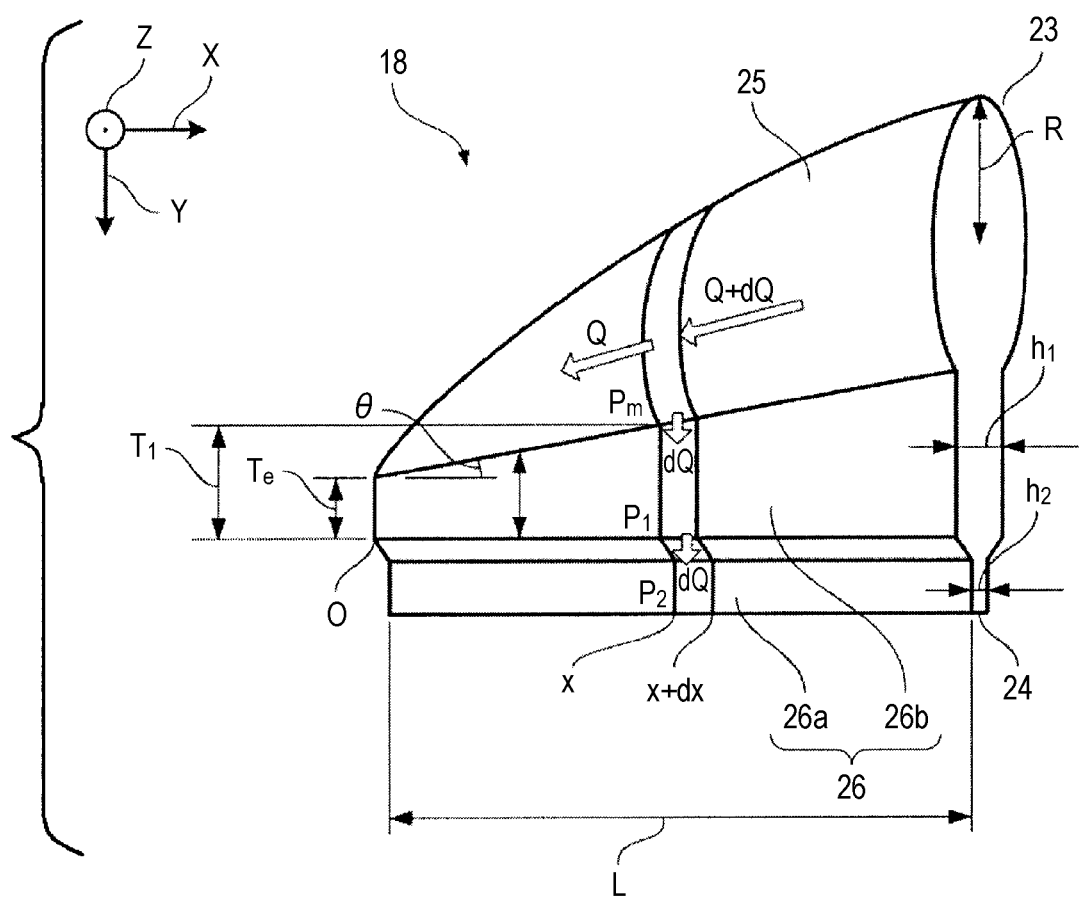
FIG. 4 is a schematic diagram for explaining an example of a shape of the flow passage.

Here, an example of the manifold section 25 and the slit section 26 will be described in detail with reference to FIG. 4. FIG. 4 is a schematic diagram for explaining an example of a shape of the flow passage 18. In FIG. 4, only a half portion in which the flow passage 18 illustrated in FIG. 3 is taken at the center portion thereof in the X-direction is illustrated.

In the example illustrated in FIG. 4, the boundary between the manifold section 25 and the slit section 26 extends linearly at an angle θ with respect to the X-direction. In other words, a dimension $T_1$ in the Y-direction of the first slit section 26a, at a position away from the end portion O by a distance x in the X-direction of the first slit section 26a toward the inflow port 23 along the X-direction, has a value that is obtained based on the following equation.

[Mathematical 5]

$$T_1 = T_e + a \cdot x \qquad \text{(Equation 1)}$$

$T_e$ is a dimension in the Y-direction of the first slit section 26a at the end portion O in the X-direction of the first slit section 26a, a is a change rate of the dimension $T_1$ with respect to a distance x, and an equation of a=tan θ is established.

The walls of the flow passage of the first slit section 26a that face to the Z-direction are parallel to each other, and the walls of the flow passage of the second slit section 26b that face to the Z-direction are parallel to each other. The manifold cross-section has a circular shape, and the radius R of the manifold cross-section, at a position away from the end portion O by a distance x in the X-direction of the first slit section 26a toward the inflow port 23 along the X-direction, has a value that is obtained based on the following equation.

[Mathematical 6]

$$R = \left[ \frac{(N+3) \cdot h_1^{N+2}}{2\pi(N+2) \cdot a^N} \cdot x \right]^{\frac{1}{N+3}} \quad \text{(Equation 2)}$$

$h_1$ is a dimension in the Z-direction of the first slit section 26a, and N is the inverse of a power law index n. The power law index n is a characteristic value of the resin raw material and obtained by the following procedure.

Figure 5:
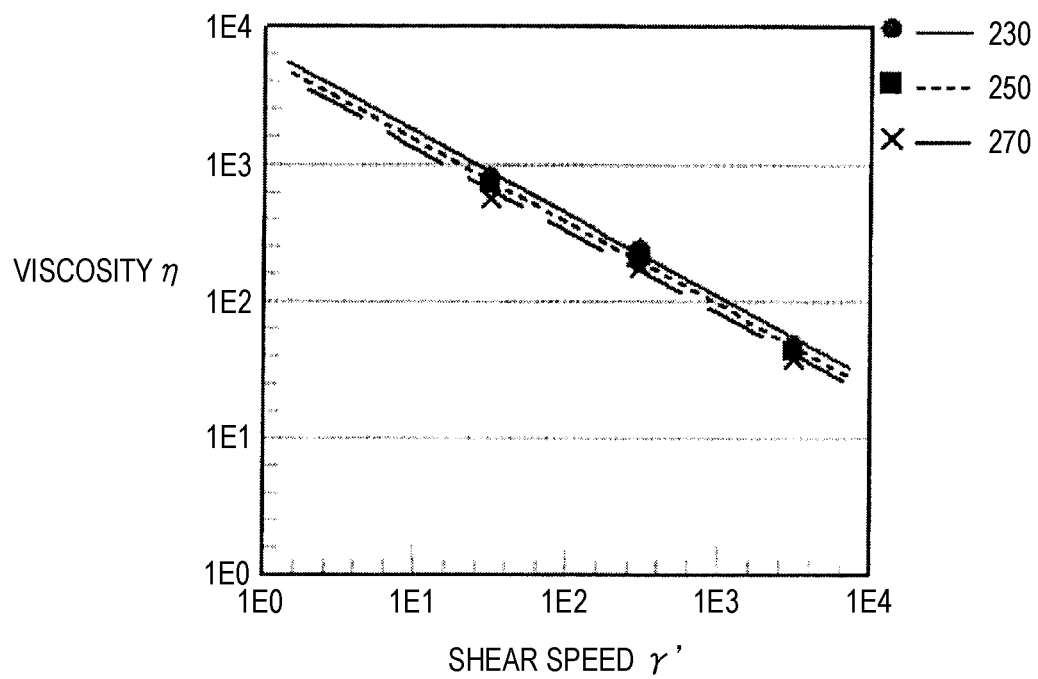
FIG. 5 is a graph illustrating an example of the relationship between a shear speed and a viscosity.

First, the relationship between a shear speed γ' and a viscosity η of the resin raw material is obtained by experiments. FIG. 5 is a graph illustrating an example of the relationship between a shear speed γ' and a viscosity η of the resin raw material. In a plot illustrated in FIG. 5, a shear speed γ' and a viscosity η of the resin raw material at 230 degrees, 250 degrees, and 270 degrees are illustrated.

In the resin raw material, it is known that the following relationship between a viscosity η and a shear speed γ' is established using a constant number m and the power law index n.

[Mathematical 7]

$$\eta = m \cdot \gamma'^{m-1} \quad \text{(Equation 3)}$$

Equation 3 is also referred to as a "power law equation".

The constant number m and the power law index n are determined such that a curve indicating the relationship of Equation 3 approximates to the relationship illustrated in the plot (FIG. 5) between a viscosity η and a shear speed γ' that is obtained by the experiments, and thus the power law index n of the resin raw material that is used to the experiments is obtained. The power law index n can be calculated using a least square method, for example. The solid line, the chain line, and the broken line illustrated in FIG. 5 respectively illustrate approximate curves of the resin raw material at 230 degrees, 250 degrees, and 270 degrees.

The technical meaning of Equation 2 will be described in detail.

It is assumed that a flow of the resin raw material in the manifold section 25 is a flow in a circular tube, and it is assumed that a flow of the resin raw material in the slit section 26 is a flow between parallel flat plates. Under this assumption, an equation indicating a balance state between a force due to a pressure of the resin raw material and a force due to a shear stress of the resin raw material is established for each of the manifold section 25, the first slit section 26a, and the second slit section 26b. Each equation of the balance is solved for a shear stress, and thus each equation of a shear stress in the manifold section 25, the first slit section 26a and the second slit section 26b is obtained.

In Newtonian fluid, it is known that the following relationship among a shear stress τ, a viscosity η, and a shear speed γ' is established.

[Mathematical 8]

$$\tau = \eta \cdot \gamma' \quad \text{(Equation 4)}$$

Equation 4 is also referred to as an "equation of Newton's law of fluid friction".

Equation 4 is solved for a shear speed γ' by substituting Equation 3 for Equation 4, and thus the following equation is obtained.

[Mathematical 9]

$$\gamma' = \left(\frac{1}{m}\right)^N \cdot \tau^N \quad \text{(Equation 5)}$$

A shear speed is the slope of a flow speed. Therefore, Equation 5 is modified as follows, using a flow speed v and a coordinate r on the cross-section in a direction perpendicular to the flow.

[Mathematical 10]

$$\frac{dv}{dr} = \gamma' = \left(\frac{1}{m}\right)^N \cdot \tau^N \quad \text{(Equation 6)}$$

Equation 6 is solved for a flow speed v, and thus the following equation is obtained.

[Mathematical 11]

$$v = \left(\frac{1}{m}\right)^N \cdot \int \tau^N dr \quad \text{(Equation 7)}$$

It is possible to obtain a flow rate on the cross-section in a direction perpendicular to the flow by substituting the equation of a shear stress of the manifold section 25, the first slit section 26a, and the second slit section 26b for Equation 7, and integrating a flow speed v by a coordinate r. The obtained equation is further modified, and thus a differential equation representing the relationship between a flow rate and a distance x is obtained.

In a case where a flow rate in the outflow port 24 is constant with respect to the X-direction, the following boundary condition is established with respect to pressure gradient.

[Mathematical 12]

$$\frac{dP_1}{dx} = 0 \quad \text{(Equation 8)}$$

Here, in Equation 8, $P_1$ is a pressure at the boundary between the first slit section 26a and the second slit section 26b. The differential equation is solved for a flow rate and a distance x using the condition of Equation 8, and thus Equation 2 is obtained.

As described above, Equation 2 is derived from the condition in which a flow rate in the outflow port 24 is constant with respect to the X-direction. Therefore, the radius R of the manifold cross-section is changed based on Equation 2, and thus a flow rate in the outflow port 24 becomes more uniform in the X-direction.

In FIG. 4, "Q" represents a flow rate of the resin raw material that passes through the manifold cross-section at the position of a distance x, and "dQ" represents a flow rate of the resin raw material that passes through the slit section 26 from the position of a distance x to the position of a distance x+dx. "$P_m$" represents a pressure at the boundary between the manifold section 25 and the first slit section 26a, and "$P_2$" represents a pressure in the outflow port 24.

Figure 6:
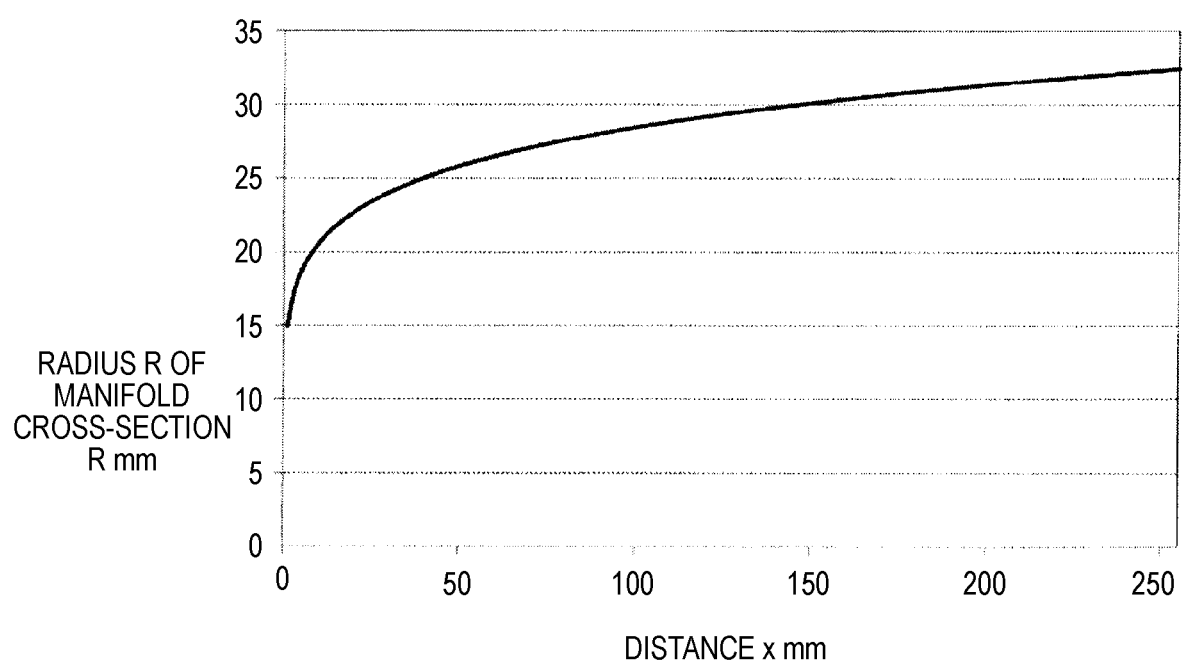
FIG. 6 is a graph illustrating an example of the radius of a manifold cross-section.

FIG. 6 is a graph illustrating an example of the radius R of the manifold cross-section that is calculated using Equation 2. When the graph illustrated in FIG. 6 is derived, values in the following table are used for each parameter.

TABLE 1

Example of Parameters

| Parameters | Values |
| --- | --- |
| Dimension $h_1$ in Z-direction of first slit section | 15 mm |
| Dimension $h_2$ in Z-direction of second slit section | 15 mm |
| Dimension $T_e$ in Y-direction of first slit section | 20 mm |
| Change rate a of dimension $T_1$ with respect to distance x | 0.35 |
| Dimension L in X-direction from end portion in X-direction to inflow port | 255 mm |
| Power law index n | 0.24 |

In the example shown in Table 1, since a dimension $h_1$ in the Z-direction of the first slit section 26a is 15 mm and a dimension $h_2$ in the Z-direction of the second slit section 26b is 15 mm, the slit section 26 has a shape in which a dimension in the Z-direction is constant from the manifold section 25 to the outflow port 24.

Of course, the present invention is not limited to the parameters shown in Table 1. Here, it is preferable that the maximum value of the area of the manifold cross-section is equal to or smaller than the area of the outlet of the extruder 16 (refer to FIG. 1). It is preferable that a dimension $h_1$ in the Z-direction of the first slit section 26a illustrated in FIG. 4 is equal to or smaller than the maximum value of the radius R of the manifold cross-section. It is preferable that a dimension $h_2$ in the Z-direction of the second slit section 26b is equal to or larger than the diameter of the through hole 20 and equal to or smaller than a dimension $h_1$ in the Z-direction of the first slit section 26a. It is preferable that a dimension $T_e$ in the Y-direction of the first slit section is shorter than the dimension $T_1$ in the Y-direction. It is preferable that the change rate a is equal to or larger than 0 and equal to or smaller than 1.

Figure 7:
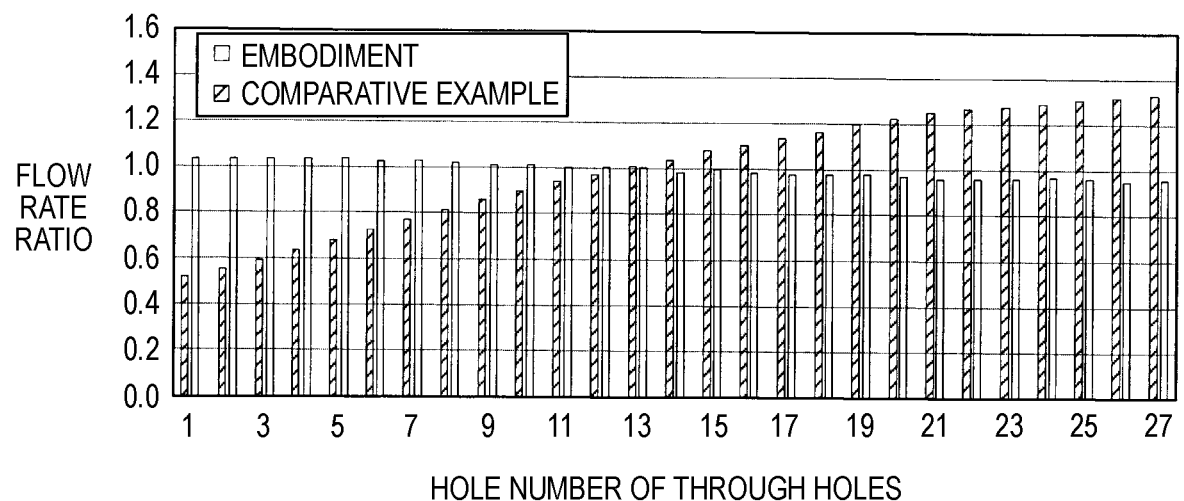
FIG. 7 is a graph illustrating a result of a numerical simulation.

FIG. 7 is a graph illustrating a result of a numerical simulation of the strand manufacturing device 13 (refer to FIG. 1) according to the present embodiment. In the numerical simulation, the radius R (refer to FIG. 4) of the manifold section 25 is changed based on Equation 2. The dimensions $h_1$, $h_2$, $T_e$, and L, the angle θ, and the power law index n are set to the values shown in Table 1. It is also assumed that the die 17 (refer to FIG. 2) in which 27 through holes 20 are formed from the end to the center portion in the X-direction is used.

In the graph illustrated in FIG. 7, the horizontal axis represents hole numbers of the through holes, and the vertical axis represents flow rate ratios. The hole numbers of the through holes are marked as "1", "2", . . . , "27" in order from the through hole 20 that is farthest away from the inflow port 23 to the through hole 20 that is closest to the inflow port 23. In other words, the hole number of the through hole 20 that is closest to the end in the X-direction is set to "1", and the hole number of the through hole 20 that is closest to the center portion in the X-direction is set to "27". A flow rate ratio is a ratio of a flow rate of each through hole 20 to the average value of flow rates in all of the through holes 20.

Figure 8:
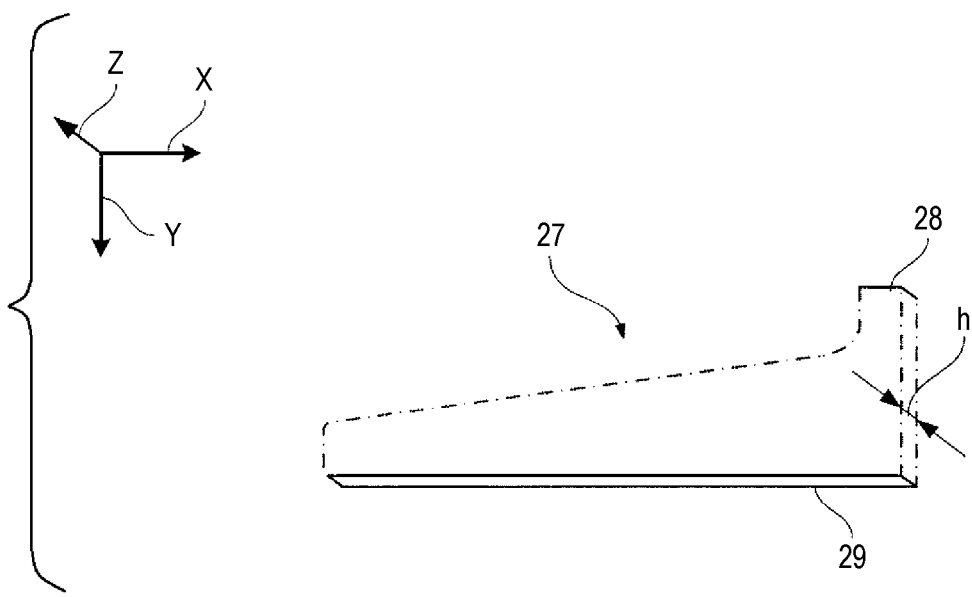
FIG. 8 is a schematic diagram for explaining a flow passage of a strand manufacturing device according to a comparative example.

In the graph illustrated in FIG. 7, the result of a numerical simulation of a strand manufacturing device according to a comparative example (hereinafter, referred to as a "comparative device") is also illustrated. FIG. 8 is a schematic diagram for explaining a flow passage of the comparative device.

As illustrated in FIG. 8, although a dimension in the X-direction of a flow passage 27 that is used for the numerical simulation of the comparative device increases gradually toward an outflow port 29 from an inflow port 28, a dimension h in the Z-direction is constant from the inflow port 28 to the outflow port 29. In other words, the flow passage 27 does not include a portion corresponding to the manifold section 25 (refer to FIGS. 3 and 4) according to the present embodiment. Other dimensions and indexes are the same as those used for obtaining the result of the numerical simulation of the strand manufacturing device 13 (refer to FIG. 1) according to the present embodiment.

FIGS. 1, 2 and 7 are referred to again. As seen in the graph illustrated in FIG. 7, in the strand manufacturing device 13 according to the present embodiment, a variation in a flow rate in the X-direction is reduced compared to the comparative device. Therefore, it is possible to reduce a variation in the outer diameter of each strand 21 that is extruded from the through hole 20.

It is possible to reduce a variation in the size and weight of the pellet 22 by using the pellet manufacturing device 12 (refer to FIG. 1) including the strand manufacturing device 13.

In the present embodiment, the cross-section of the manifold section 25 has a circular shape. The walls of the flow passage of the first slit section 26a that face to the Z-direction are parallel to each other, and the walls of the flow passage of the second slit section 26b that face to the Z-direction are parallel to each other. The outflow port 24 has a rectangular shape. The present invention is not limited to the embodiment.

For example, the cross-section of the manifold section 25 may have an elliptical shape or a quadrilateral shape. The walls of the flow passage of the first slit section 26a that face to the Z-direction may not be parallel to each other, and the walls of the flow passage of the second slit section 26b that face to the Z-direction may not be parallel to each other. The outflow port 24 may have an elliptical shape. Even in such an embodiment, the manifold section 25 and the slit section 26 may have a shape based on an equation corresponding to Equation 2. The equation corresponding to Equation 2 is obtained by solving the equation indicating a balance state between a force due to a pressure of the resin raw material and a force due to a shear stress of the resin raw material in each of the manifold section 25 and the slit section 26, using the relationship among a shear stress, a viscosity, and a shear speed, the relationship between a shear speed and the slope of a flow speed, and the relationship between a flow speed and a flow rate, under a condition in which a flow rate in the outflow port 24 is constant with respect to the X-direction.

Figure 9:
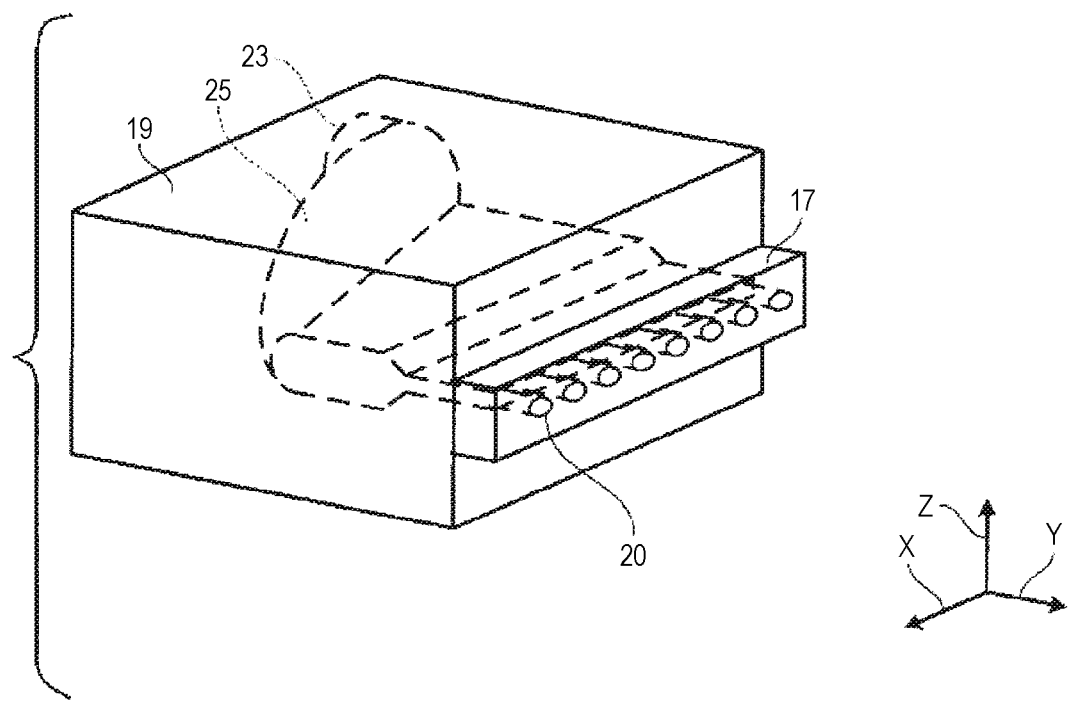
FIG. 9 is a perspective view illustrating another form of the flow passage.
Figure 10:
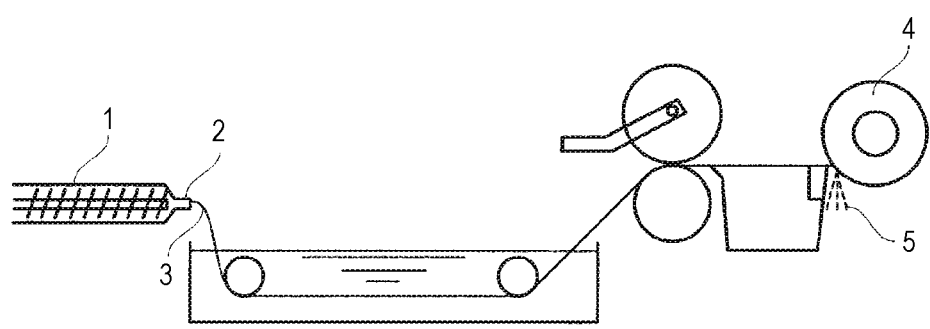
FIG. 10 is a diagram for explaining a strand-cut method.
Figure 11:
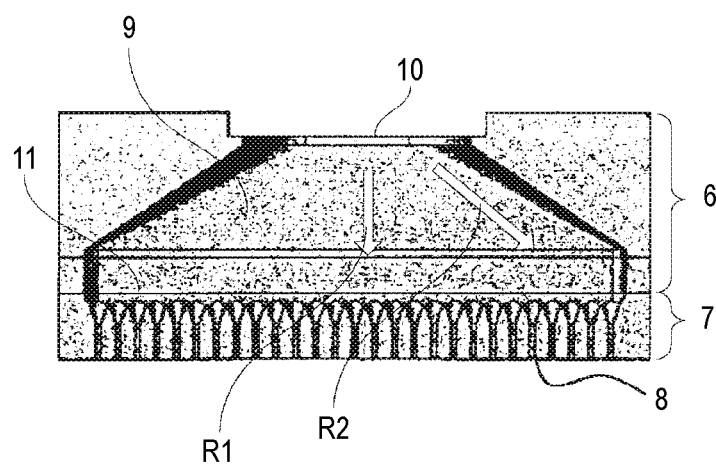
FIG. 11 is a schematic diagram of a flow passage member and a die that are related with each other.

In the present embodiment, although the manifold section 25 extends from the inflow port 23 along the X-direction in both directions, the present invention is not limited to the embodiment. For example, as illustrated in FIG. 9, the manifold section 25 may extend from the inflow port 23 along the X-direction in one direction.

As above, although the present invention has been described with reference to the embodiments and examples, the present invention is not limited to the embodiments and examples described above. The present invention can include various modifications which can be made by those skilled in the art.

The present invention is not limited to the embodiments described above, and modifications and improvements thereof can be appropriately made. In addition, a material, a shape, a dimension, a numerical value, a form, a number, a installation location, or the like of each component in the embodiment described above are arbitrary as long as the present invention can be achieved, and are not limited.

Although the present invention has been described in detail with reference to the specific embodiments, it is clear for those skilled in the art that various changes or alterations can be made hereto without departing from the spirit and scope of the present invention.

This application is based upon and claims the benefit of priority from Japanese Patent Application No. 2014-131063; filed Jun. 26, 2014; the entire contents of which are incorporated herein by reference.

Here, the features of the embodiments of the strand manufacturing device, the pellet manufacturing device, the strand manufacturing method, and the pellet manufacturing method according to the present invention described above are briefly summarized and described as in the followings [1] to [8], respectively.

[1] A strand manufacturing device comprising:
a die comprising a plurality of through holes arranged therein; and
a flow passage member that defines a flow passage for supplying resin raw material in a molten state to the plurality of through holes,
wherein the flow passage comprises:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases, and
wherein a cross-section of the manifold section that is orthogonal to the first direction decreases gradually as a distance from the inflow port in the first direction increases.

[2] The strand manufacturing device according to the above [1], wherein the manifold section and the slit section have a shape based on an equation obtained by solving an equation indicating a balance state between a force due to a pressure of the resin raw material and a force due to a shear stress of the resin raw material in each of the manifold section and the slit section, using the relationship among a shear stress, a viscosity, and a shear speed, the relationship between a shear speed and the slope of a flow speed, and the relationship between a flow speed and a flow rate, under a condition in which a flow rate in the outflow port is constant with respect to the first direction.

[3] The strand manufacturing device according to the above [1],
wherein the slit section comprises an adjacent slit section that is adjacent to the manifold section, wherein the walls of the flow passage of the adjacent slit section that face to a third direction orthogonal to the first direction and the second direction are parallel to each other, wherein a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e + a \cdot x \qquad \text{[Mathematical 13]}$$

wherein a cross-section of the manifold section has a circular shape, and the radius R of the cross-section of the manifold section at a position away from the end portion of the adjacent slit section by a distance x toward the inflow port along the first direction has a value that is obtained based on the following equation:

[Mathematical 14]
$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to a distance x, N is the inverse of a power law index of the resin raw material, and $h_1$ is a dimension in the third direction of the adjacent slit section.

[4] A pellet manufacturing device comprising:
the strand manufacturing device according to any one of the above [1] to [3]; and
a cutting device that cuts strands which are collectively manufactured by using the strand manufacturing device.

[5] A strand manufacturing method comprising:
a step of supplying resin raw material in a molten state from a flow passage member to a die, the die comprising a plurality of through holes arranged therein; and
a step of molding strands by extruding the resin raw material from the plurality of through holes,
wherein as the flow passage member, a member that defines a flow passage is used as the flow passage member, the flow passage comprising:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases, and
wherein a cross-section of the manifold section that is orthogonal to the first direction decreases gradually as a distance from the inflow port in the first direction increases.

[6] The strand manufacturing method according to the above [5], wherein as the flow passage member, the member that defines the flow passage is used as the flow passage member, the manifold section and the slit section having a shape based on an equation obtained by solving an equation indicating a balance state between a force due to a pressure of the resin raw material and a force due to a shear stress of the resin raw material in each of the manifold section and the slit section, using the relationship among a shear stress, a viscosity, and a shear speed, the relationship between a shear speed and the slope of a flow speed, and the relationship between a flow speed and a flow rate, under a condition in which a flow rate in the outflow port is constant with respect to the first direction.

[7] The strand manufacturing method according to the above [5],
wherein as the flow passage member, the member that defines the flow passage is used as the flow passage member, the slit section comprising an adjacent slit section that is adjacent to the manifold section, in which the walls of the flow passage of the adjacent slit section that face to a third direction orthogonal to the first direction and the second direction are parallel to each other, in which a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e + a \cdot x \quad \text{[Mathematical 15]}$$

in which a cross-section of the manifold section has a circular shape, and the radius R of the cross-section of the manifold section at a position away from the end portion of the adjacent slit section by a distance x toward the inflow port along the first direction has a value that is obtained based on the following equation:

[Mathematical 16]

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to a distance x, N is the inverse of a power law index of the resin raw material, and $h_1$ is a dimension in the third direction of the adjacent slit section.

[8] A pellet manufacturing method comprising:
a step of collectively manufacturing a plurality of strands by using the strand manufacturing method according to any one of the above [5] to [7]; and
a step of cutting the plurality of strands.

INDUSTRIAL APPLICABILITY

According to the present invention, it is possible to reduce a variation in the outer diameter of each strand. The present invention exhibiting such an effect is useful in the field of the strand manufacturing device, the pellet manufacturing device, the strand manufacturing method, and the pellet manufacturing method.

REFERENCE SIGNS LIST 12 pellet manufacturing device
13 strand manufacturing device
15 cutting means
16 extruder
17 die
18 flow passage
19 flow passage member
20 through hole
21 strand
22 pellet
23 inflow port
24 outflow port
25 manifold section
26 slit section
26a first slit section (adjacent slit section)
26b second slit section

The invention claimed is:

1. A strand manufacturing device comprising:
a die comprising a plurality of through holes arranged therein; and
a flow passage member that defines a flow passage for supplying resin raw material in a molten state to the plurality of through holes,
wherein the flow passage comprises:
an outflow port that extends in a first direction in which the plurality of through holes are arranged and reaches to the plurality of through holes, the first direction being perpendicular to a direction in which the resin raw material flows out from the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases,
wherein a cross-section of the manifold section along the entire length of the manifold section that is orthogonal to the first direction decreases gradually as a distance from the inflow port in the first direction increases,
wherein the slit section comprises an adjacent slit section that is adjacent to the manifold section, wherein the walls of the flow passage of the adjacent slit section that face to a third direction orthogonal to the first direction and the second direction are parallel to each other, wherein a dimension $T_1$ in the second direction of the adjacent slit section at a position away from the end portion by the distance x in the first direction of the adjacent slit section toward the inflow port along the first direction has a value that is obtained based on the following equation:

$$T_1 = T_e + a \cdot x$$

wherein a cross-section of the manifold section has a circular shape, and the radius R of the cross-section of the manifold section at a position away from the end portion of the adjacent slit section by a distance x toward the inflow port along the first direction has a value that is obtained based on the following equation:

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to the distance x, N is the inverse of a power law index of the resin raw material, and $h_1$ is a dimension in the third direction of the adjacent slit section.

2. A pellet manufacturing device comprising:
the strand manufacturing device according to claim 1; and
a cutting device that cuts strands which are collectively manufactured by using the strand manufacturing device.

3. A strand manufacturing method comprising:
a step of supplying resin raw material in a molten state from a flow passage member to a die, the die comprising a plurality of through holes arranged therein; and
a step of molding strands by extruding the resin raw material from the plurality of through holes,
wherein as the flow passage member, a member that defines a flow passage is used as the flow passage member, the flow passage comprising:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases,
wherein a cross-section of the manifold section that is orthogonal to the first direction decreases gradually as a distance from the inflow port in the first direction increases,
wherein as the flow passage member, the member that defines the flow passage is used as the flow passage member, the slit section comprising an adjacent slit section that is adjacent to the manifold section, in which the walls of the flow passage of the adjacent slit section that face to a third direction orthogonal to the first direction and the second direction are parallel to each other, in which a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e + a \cdot x$$

in which a cross-section of the manifold section has a circular shape, and the radius R of the cross-section of the manifold section at a position away from the end portion of the adjacent slit section by the distance x toward the inflow port along the first direction has a value that is obtained based on the following equation:

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to the distance x, N is the inverse of a power law index of the resin raw material, and $h_1$ is a dimension in the third direction of the adjacent slit section.

4. A pellet manufacturing method comprising:
a step of collectively manufacturing a plurality of strands by using the strand manufacturing method according to claim 3; and
a step of cutting the plurality of strands.

5. A strand manufacturing device comprising:
a die comprising a plurality of through holes arranged therein; and
a flow passage member that defines a flow passage for supplying resin raw material in a molten state to the plurality of through holes,
wherein the flow passage comprises:
an outflow port that extends in a first direction in which the plurality of through holes are arranged and reaches to the plurality of through holes;
an inflow port in which a dimension in the first direction is smaller than a dimension of the outflow port;
a manifold section that extends from the inflow port in the first direction and a second direction orthogonal to the first direction; and
a slit section that is connected to the manifold section in the second direction and extends from the manifold section to the outflow port,
wherein a dimension in the second direction of the slit section decreases gradually as a distance from the inflow port in the first direction increases,
wherein a cross-section of the manifold section that is orthogonal to the first direction decreases gradually as a distance from the inflow port in the first direction increases,
wherein the slit section comprises an adjacent slit section that is adjacent to the manifold section, wherein the walls of the flow passage of the adjacent slit section that face to a third direction orthogonal to the first direction and the second direction are parallel to each other, wherein a dimension $T_1$ in the second direction of the adjacent slit section at a position away from the end portion by a distance x in the first direction of the adjacent slit section toward the inflow port along the first direction has a value that is obtained based on the following equation:

$$T_1 = T_e + a \cdot x$$

wherein a cross-section of the manifold section has a circular shape, and the radius R of the cross-section of the manifold section at a position away from the end portion of the adjacent slit section by the distance x toward the inflow port along the first direction has a value that is obtained based on the following equation:

$$R = \left[ \frac{(N+3) \cdot h_1^{N+2}}{2\pi(N+2) \cdot a^N} \cdot x \right]^{\frac{1}{N+3}}$$

where $T_e$ is a dimension in the second direction of the adjacent slit section at the end portion of the adjacent slit section, a is a change rate of a dimension $T_1$ with respect to the distance x, N is the inverse of a power law index of the resin raw material, and $h_1$ is a dimension in the third direction of the adjacent slit section.

* * * * *